Jan. 14, 1941.  R. F. HAGGERTY  2,228,267
SPEED CONTROL AND STEERING MECHANISM
Filed Jan. 6, 1939
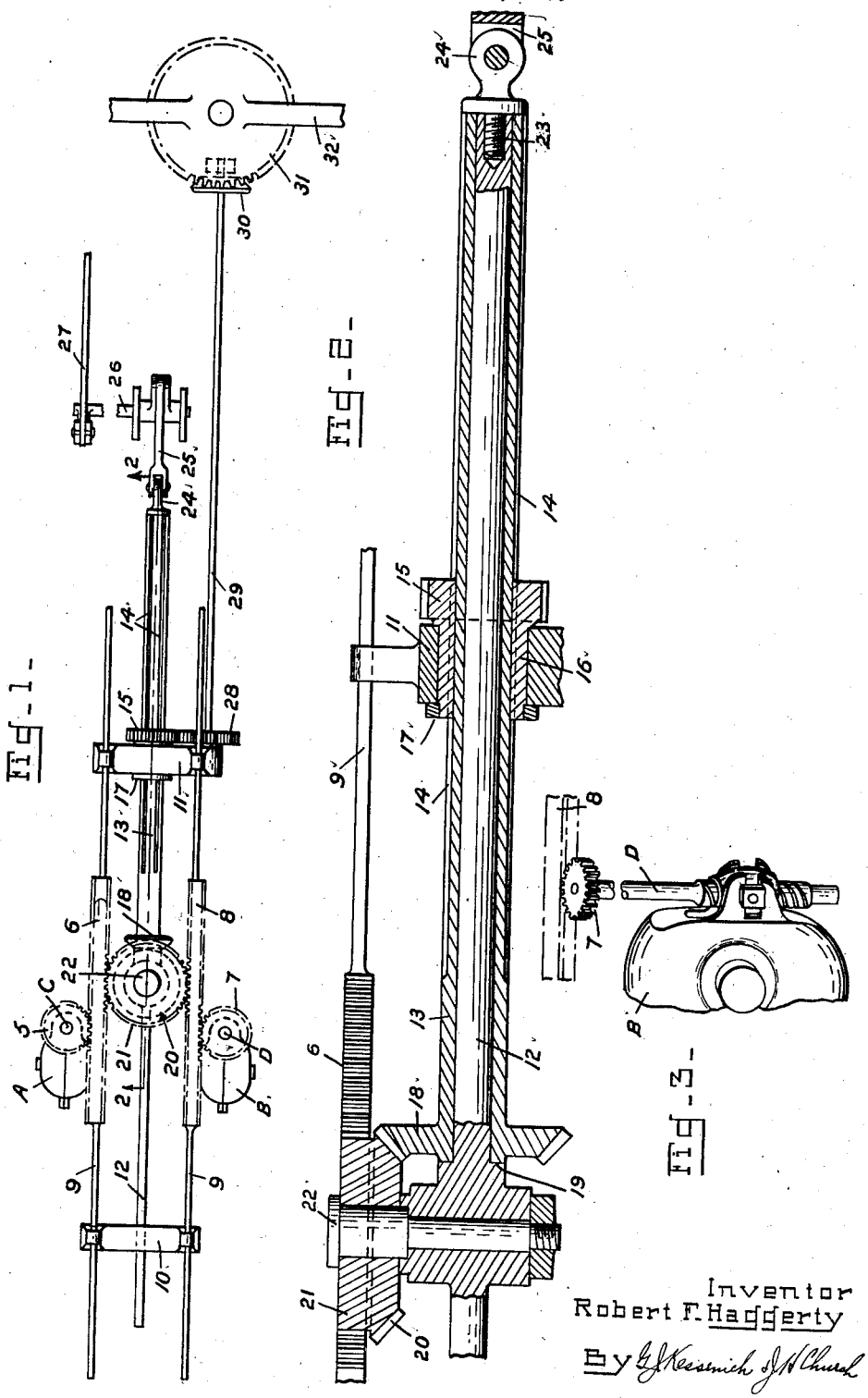
Inventor
Robert F. Haggerty
By [signatures]
Attorneys Patented Jan. 14, 1941

2,228,267

UNITED STATES PATENT OFFICE 2,228,267

SPEED CONTROL AND STEERING MECHANISM

Robert F. Haggerty, United States Army, Aberdeen, Md.

Application January 6, 1939, Serial No. 249,615

4 Claims. (Cl. 74—422)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a speed control and steering mechanism and is particularly applicable to hydraulic variable speed gear devices in which the direction and speed of the driven shaft of an hydraulic motor is regulated by movement of a tilting box associated with a pump operated by the driving power.

The purpose of this invention is to provide a mechanism for operating a pair of power controls such as the tilting boxes of a pair of hydraulic variable speed gear devices whereby the driven members may be operated in unison or may be varied to accomplish steering. As an example the driven members may be the tracks of a tracklaying vehicle in which steering is performed by driving the tracks at different speeds or in opposite directions.

A further object of the invention is to so arrange the mechanism that the speed control and the steering units have elements in common.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view of a mechanism constructed in accordance with the invention;

Fig. 2 is a sectional view on the line 2—2 of Fig. 1 with parts in elevation;

Fig. 3 is a perspective view of the tilting box control shaft.

Referring to the drawing by characters of reference there is shown a pair of tilting boxes A and B each belonging to the pump unit of an hydraulic variable speed gear of the "Waterbury" type and arranged to be tilted to regulate the direction and speed of a driven member by means of the respective control shafts C and D. The worms on the control shafts are oppositely threaded so that rotation of the control shafts in opposite directions causes the two tilting boxes to move in the same direction.

A pinion 5 on the shaft C meshes with a rack 6 and a pinion 7 on the shaft D meshes with a rack 8. The racks are each mounted on one of a pair of rods 9—9 slidably carried in a pair of supports 10 and 11.

An axially movable rod 12 positioned between the racks 6 and 8 has one end mounted in the support 10 while its other end passes through a sleeve 13 extending through the support 11. The sleeve is provided externally with splines 14 whereby it is slidably and rotatably in engagement with a gear 15 whose hub 16 is rotatably mounted in the support 11. The hub 16 includes a provision in the form of a ring or flange 17 which engages the support on the side opposite to the gear and thereby holds the gear against axial displacement.

A bevel gear 18 on one end of the sleeve 13 abuts against a shoulder 19 on the rod 12 and meshes with a bevel gear 20 which is formed on a pinion 21 that is mounted on a pin 22 carried by the rod 12. The pinion 21 is positioned between and meshes with the racks 6 and 8.

A plug 23 threaded in one end of the rod 12 confines the sleeve 13 and includes an eye 24 for attachment of a link 25 that is reciprocated by means of a control shaft 26 and a hand lever 27.

A gear 28 meshing with the gear 15 is fixed on a shaft 29 which carries a pinion 30 driven in opposite directions by a gear 31 under control of a rudder bar 32.

The speed control of the driven members is accomplished by operating the hand lever 27 to move the rod 12 and sleeve 13 axially and displace the racks 6 and 8 equal amounts in the same direction. The control shafts C and D are thereby rotated in opposite directions but since they are oppositely threaded the associated tilting boxes A and B will be moved in the same direction.

The steering control of the driven members is accomplished by operating the rudder bar 32 to rotate the shaft 29 and also the sleeve 13 irrespective of its longitudinal displacement under influence of the hand lever 27. Rotation of the sleeve 13 in either direction drives the pinion 21 and displaces the racks 6 and 8 equal amounts in opposite directions. As a consequence the tilting boxes A and B will be moved in opposite directions and will assume different inclinations. Since the direction and speed of each driven member is regulated by the position of inclination of its tilting box it will be apparent that the driven members of a pair of units will be operated at different speeds or in different directions when the tilting boxes of the pair of units are at different inclinations. Where the driven members are the tracks on opposite sides of a tracklaying vehicle their movement at different speeds or in different directions will provide for steering of the vehicle.

I claim:

1. Actuating means for a pair of hydraulic variable speed gear devices each including a tilting box with a rotatable control shaft, the shafts being oppositely threaded, a pinion on each shaft, a pair of axially movable racks each meshing with one of the pinions, an axially movable rod between the racks, a pinion carried by the rod and meshing with both racks, a bevel gear on the pinion, a sleeve rotatable on the rod and movable axially therewith, a bevel gear on the sleeve meshing with the bevel gear on the pinion, a rotatably and axial immovably mounted gear splined on the sleeve, means for rotating said gear to rotate the sleeve and the pinion on the rod to displace the racks equal amounts in opposite directions, and means for moving the rod and sleeve axially to displace the racks equal amounts in the same direction.

2. Actuating means for a pair of hydraulic variable speed gear devices each including a tilting box, a pair of axially movable racks each controlling the tilting movement of a tilting box, an axially movable rod between the racks, a pinion carried by the rod and meshing with both racks, a sleeve rotatable on the rod and movable axially therewith, gearing between the sleeve and pinion, a rotatably and axially immovably mounted gear splined on the sleeve, means for rotating said gear to rotate the sleeve and the pinion on the rod to displace the racks equal amounts in opposite directions, and means for moving the rod and sleeve axially to displace the racks equal amounts in the same direction.

3. Actuating means for a pair of hydraulic variable speed gear devices each including a tilting box, a pair of axially movable racks each controlling the tilting movement of a tilting box, an axially movable rod between the racks, a pinion carried by the rod and meshing with both racks, a sleeve rotatable on the rod and movable axially therewith, gearing between the sleeve and pinion, means for rotating the sleeve to drive the pinion on the rod and displace the racks equal amounts in opposite directions, and means for moving the rod and sleeve axially to displace the racks equal amounts in the same direction.

4. Actuating means for a pair of power controls, a pair of axially movable racks each regulating the movement of a control, a pinion meshing with both racks, means for rotating the pinion to displace the racks equal amounts in opposite directions, and means for bodily moving the pinion to displace the racks equal amounts in the same direction.

ROBERT F. HAGGERTY.